Jan. 1, 1935.  C. W. HARRIS  1,986,149

FLEXIBLE COUPLING

Filed May 21, 1934

INVENTOR
C. W. Harris
BY
ATTORNEY

Patented Jan. 1, 1935

1,986,149

UNITED STATES PATENT OFFICE 1,986,149

FLEXIBLE COUPLING

Cyrus W. Harris, Sacramento, Calif., assignor to A. J. Morrison, an individual doing business as Morrison Trailer Manufacturing Co., Sacramento, Calif.

Application May 21, 1934, Serial No. 726,715

4 Claims. (Cl. 280—33.1)

This invention relates to flexible couplings, and particularly to a device of this character designed to serve as a swivel or fifth wheel connection between a motor truck and its semi-trailer body.

The principal objects of my invention are to provide a coupling particularly adapted for this purpose which enables the trailer body to have the necessary flexible action in all directions relative to the truck but without any loose play; one which transmits the pull from the truck to the trailer with a minimum of resistance and without any possible binding; one which may be adjusted vertically according as different installations may require; and one which allows the trailer body to be easily and quickly disconnected from the truck as is frequently desired.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
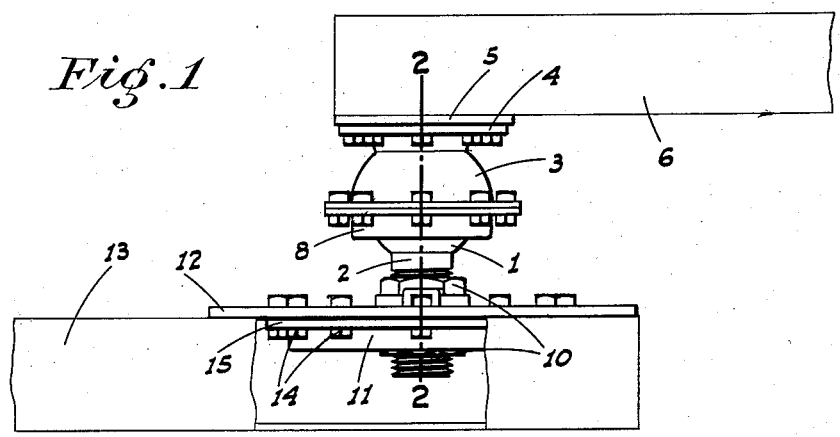
Figure 1 is a side elevation of my improved coupling unit as mounted on a truck and semi-trailer body.
Figure 2:
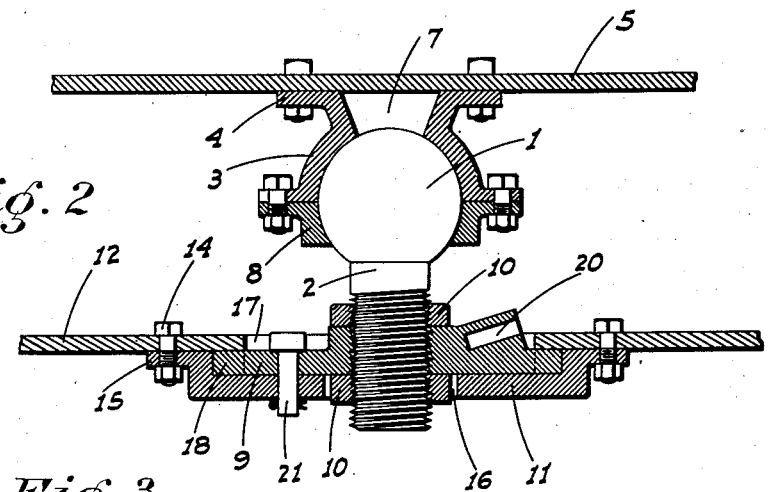
Figure 2 is an enlarged transverse section of the unit on the line 2—2 of Figure 1.
Figure 3:
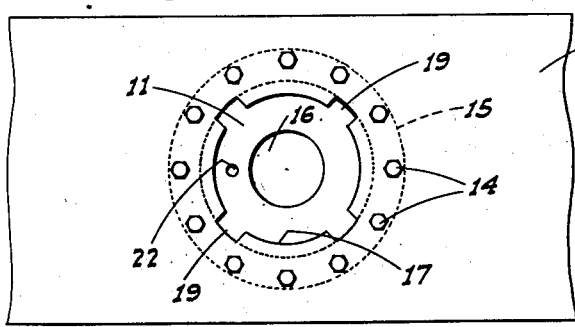
Figure 3 is a top plan view of the truck mounted supporting plate of the device.
Figure 4:
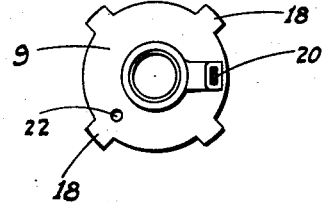
Figure 4 is a plan view of the base plate of the coupling.

Referring now more particularly to the characters of reference on the drawing, the numeral 1 denotes a ball having a depending threaded frame 2. This ball projects into a semi-spherical socket member 3 having an enlarged flange 4 at its upper end adapted to be rigidly secured to the under side of a rigid plate 5 which is mounted on and under the frame 6 of the semi-trailer at the front end thereof. The member 3 is provided with a chamber 7 leading from the top of the flange 4 to the ball socket and forms a reservoir for grease, being closed on top by the plate 5. A cap 8 is secured to the lower end of the socket member 3 and engages the adjacent portion of the ball to prevent displacement of the same without interfering with its universal movement and of course practically forms a part of the ball engaging socket.

Adjustably screwed onto the stem is a relatively large circular plate or disk 9 held against rotation on the stem by upper and lower lock nuts 10. This disk is adapted to flatly rest in and be supported by a shallow cup 11. This cup is disposed under a rigid plate 12 which extends between and is mounted on the side frames 13 of the truck at its rear end. This cup is rigidly mounted on the plate by bolts 14 projecting through said plate and through a rim flange 15 on the cup. The bottom of the cup has an orifice 16 of sufficient size to allow the lower lock nut 10 to project therethrough in the clear.

The plate 12 has an opening 17 concentric with the cup and approximately the diameter of the disk 9, so that the latter can pass through the plate opening into the cup. The disk has a plurality of radially projecting lugs 18 adapted to project through slots 19 similarly spaced about the plate opening 17. The internal diameter of the cup is approximately equal to the diameter of the periphery of the lugs 18 so that the plate overhangs the bore of the cup somewhat.

To enable the disk to enter the cup it must therefore be initially positioned so that the lugs 18 and slots 19 register with each other. If the disk when then depressed is turned so that the lugs pass under the plate beyond the slots, it cannot of course be displaced upwardly. To enable the necessary turning movement to be easily applied to the disk it is provided with a radial socket 20 positioned to receive one end of a suitable turning bar which of course must project in the clear of the plate 12. Once the disk is thus turned it is held against rotative movement by a holding pin 21 which removably projects through holes 22 in the disk and cup, said holes being of course positioned so as to register only when the disk has been turned a predetermined amount.

To remove the coupling unit from the truck it is of course only necessary to remove the pin 21 and turn the disk until its lugs 18 again aline with the slots 19. Said disk may then of course be withdrawn from the cup by an upward movement.

From the above description it is evident that besides the use above described, this structure may also be used as a fifth wheel for the front swivel truck of a trailer as well as a coupling or hinge connection in cases where a universal flexible action is desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A flexible coupling for connecting a pair of separate vertically spaced parts comprising a ball, a stem extending radially therefrom, a socket unit in which the ball is mounted, means to secure said unit on the one part, a disk secured on the stem, a cup in which said disk is removably seated, and means to mount said cup on the other part.

2. A structure as in claim 1, in which the stem is threaded and the disk is adjustably screwed onto the stem whereby the spacing between the parts may be altered.

3. A structure as in claim 1, with means to releasably hold the disk against axial movement relative to the cup.

4. A flexible coupling for connecting a pair of separate vertically spaced parts comprising a ball, a stem depending radially therefrom, a socket unit in which the ball is mounted, means to secure said unit on the upper part, a disk secured on the stem, lugs projecting radially from the stem, a supporting cup to turnably receive the disk and lugs, a plate secured to the lower part from which the cup depends and to which it is secured, said plate having an opening concentric with the cup to receive the disk therethrough, and said opening having radial slots to register with the disk lugs, and means to releasably hold the disk against rotation in the cup after said disk and lugs have been projected through the plate opening and slots and then turned a predetermined distance relative thereto.

CYRUS W. HARRIS.